United States Patent [19]

Ring

[11] 3,813,588

[45] May 28, 1974

[54] EFFICIENT POWER DARLINGTON DEVICE CONFIGURATION

[75] Inventor: Charles M. Ring, Mesa, Ariz.

[73] Assignee: Motorola, Inc., Chicago, Ill.

[22] Filed: July 9, 1973

[21] Appl. No.: 377,484

[52] U.S. Cl........ 317/235 R, 317/235 D, 317/235 Z
[51] Int. Cl............................................. H01l 19/00
[58] Field of Search.................... 317/235, 22, 40.13

[56] References Cited

UNITED STATES PATENTS 3,596,150 7/1971 Berthold et al..................... 317/235

*Primary Examiner*—Rudolph V. Rolinec
*Assistant Examiner*—E. Wojciechowicz
*Attorney, Agent, or Firm*—Vincent J. Rauner; Charles R. Hoffman

[57] ABSTRACT

An efficient integrated circuit power Darlington device having first and second rows of emitter subregions. The power Darlington device is substantially elongated, and an elongated collector contact region extends along one side thereof, contacting an extending portion of an elongated buried layer region. In the output power transistor a ballast resistor is positioned between each pair of emitter subregions in the second row, and each of the emitter subregions of a pair is connected to one end of the ballast resistor therebetween, the other end of the ballast resistor being connected to the emitter terminal. A ballast resistor is positioned adjacent each emitter subregion in the first row. Each emitter subregion in the second row is connected to one end of the adjacent ballast resistor, the other end of which is connected to the emitter terminal. The base preohmic region of the output transistor substantially surrounds each of the emitter subregions. The emitter of the input transistor is connected to the base of the output transistor. Low saturation resistance, short base metallization extensions, and high thermal dissipation efficiency are achieved by the structure, providing a device with very high safe operating area.

5 Claims, 4 Drawing Figures

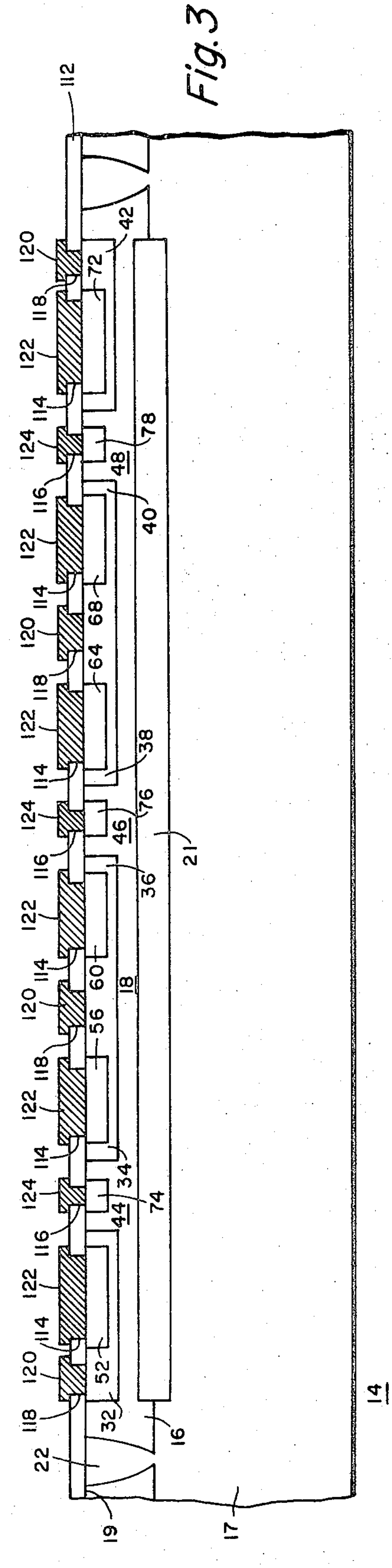
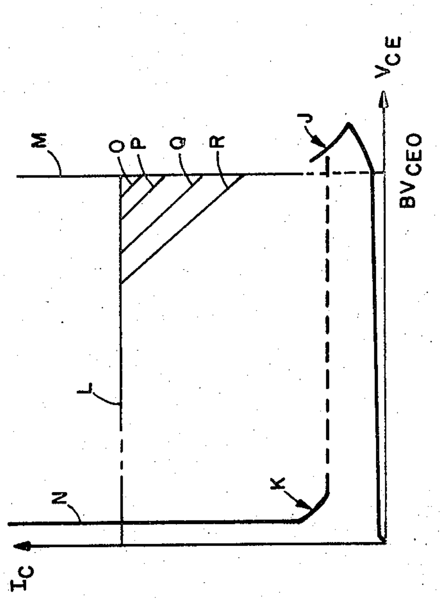
Fig. 4
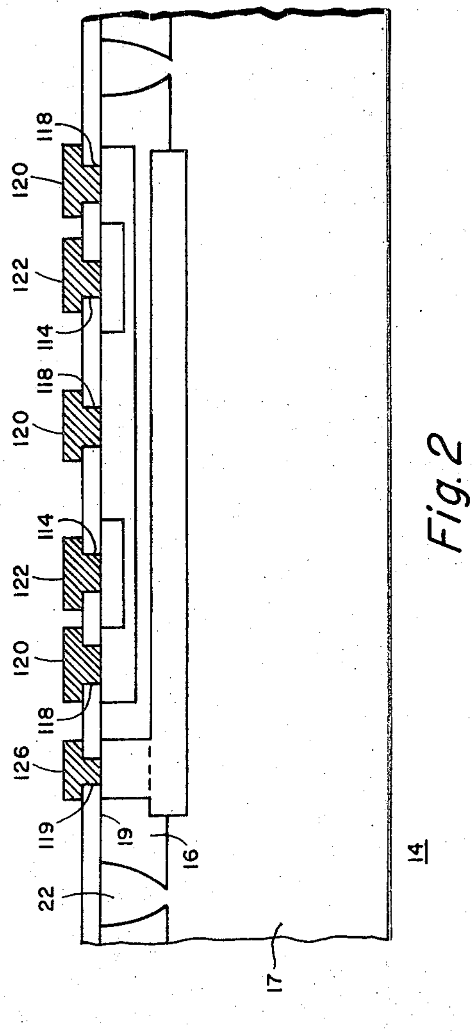
Fig. 2

EFFICIENT POWER DARLINGTON DEVICE CONFIGURATION

FIELD OF THE INVENTION

The invention relates to power transistors having ballast resistor debiasing and emitter and base subregion structures which provide high thermal dissipation efficiency. More particularly, the invention relates to Darlington devices having such power transistors therein.

DESCRIPTION OF THE PRIOR ART

Power transistors, such as those which may be used in integrated circuit power Darlington devices, typically have an interdigitated configuration for the surface emitter-base junction. Such configurations require long, narrow extensions of base metal and emitter metal making ohmic contacts, respectively, to the "fingers" of the emitter and base regions. As a result, appreciable voltage drops occur across such long, narrow metal extensions, causing a variation along the emitter-base junction in the emitter-base bias voltage under operating conditions. This condition is especially pronounced at high operating currents, causing high current densities at the most strongly forward biased portion of the emitter-base junction. This, in turn, causes hot spots to develop at the regions of high current density, which cause yet further increases in the current at the hot spot, due to the well-known tendency of the current through a junction to increase with temperature. Unless some type of current limiting is provided, for example, by an external load or by resistance in series with either the emitter or the base, the current will increase until the device is destroyed. Further contributing to the development of hot spots along the emitter-base junction in the above-described inter-digitated type of device is the fact that such structures have poor thermal dissipation properties. Power dissipated at the emitter-base junction, usually near the surface, is primarily conducted away from the hot spot through the semiconductor material in a lateral and also in a downward direction. However, if there are a very large number of "fingers" in the structure, they all radiate heat laterally outward from the PN junctions, causing a rapid build-up of temperature in the regions between said emitter fingers, resulting in poor thermal dissipation efficiency. This increases the likelihood of current hogging in hot spots, which in turn reduces the safe operating area (SOA) of the device. The SOA is a measure of the maximum power dissipation at which the device can reliably operate. Power transistors of the prior art frequently require collector contact diffusions which extend along more than one side of the device, and occupy a substantial amount of chip area. Further, integrated Darlington circuits of the prior art frequently require $N^+$ cross-unders to facilitate various connections, for example, to connect the emitter of the driver transistor to the base of the output transistor. Such $N^+$ cross-unders require additional space and have a tendency to cause low yield. Segmented emitters are used in power transistors of the prior art, and ballast resistors are provided in series with each of the emitter segments or subregions to provide debiasing of the emitter-base junction to offset localized increases in current density caused by hot spots. Such ballast resistors have normally been placed adjacent to the main active area power transistor, requiring additional die surface area, thereby increasing the cost of the product.

The invention alleviates the aforementioned problems of integrated power Darlington devices and power transistors of the prior art by providing a structure for a power transistor which has improved thermal dissipation efficiency, and minimizes die area by eliminating $N^+$ cross-unders and by positioning some of the ballast resistors between emitter subregions. The power transistor has an elongated geometry, permitting use of a collector contact region on only one side of the die to produce a very low saturation resistance. Substantially improved safe operating area is thereby achieved.

SUMMARY OF THE INVENTION

In view of the foregoing, it is an object of this invention to provide a power transistor having improved thermal dissipation efficiency utilizing a minimum amount of die area.

It is another object of this invention to provide an integrated power Darlington circuit having an improved safe operating area characteristic, yet requiring minimum die area.

Another object of this invention is to provide a power transistor having a plurality of emitter subregions forming first and second rows, a base preohmic structure substantially surrounding each of the emitter subregions and having minimum voltage drop along extensions of base metallization, and internal ballast resistors positioned between the emitter subregions.

Briefly described, the invention provides an efficient integrated power transistor having a base region divided into a plurality of subregions. The emitter consists of first and second rows of elongated emitter subregions, and the base preohmic structure substantially surrounds each of the elongated emitter subregions. A plurality of inner subregions of the collector extend to the surface of the device, and are substantially surrounded by adjacent base subregions. Some of the emitter ballast resistors are positioned internally, one in each of the inner subregions. The power transistor has an elongated overall structure, having a collector contact region along one side thereof.

BRIEF DESCRIPTION OF THE DRAWINGS

FIG. 2 is a cross-sectional view of the embodiment of FIG. 2 taken substantially along the lines 2—2.

FIG. 3 is a cross-sectional view of the embodiment of FIG. 1 taken substantially along section lines 3—3.

FIG. 4 is a graph useful in describing the phenomena affecting the safe operating area of a power transistor.

DESCRIPTION OF THE INVENTION

Figure 1:
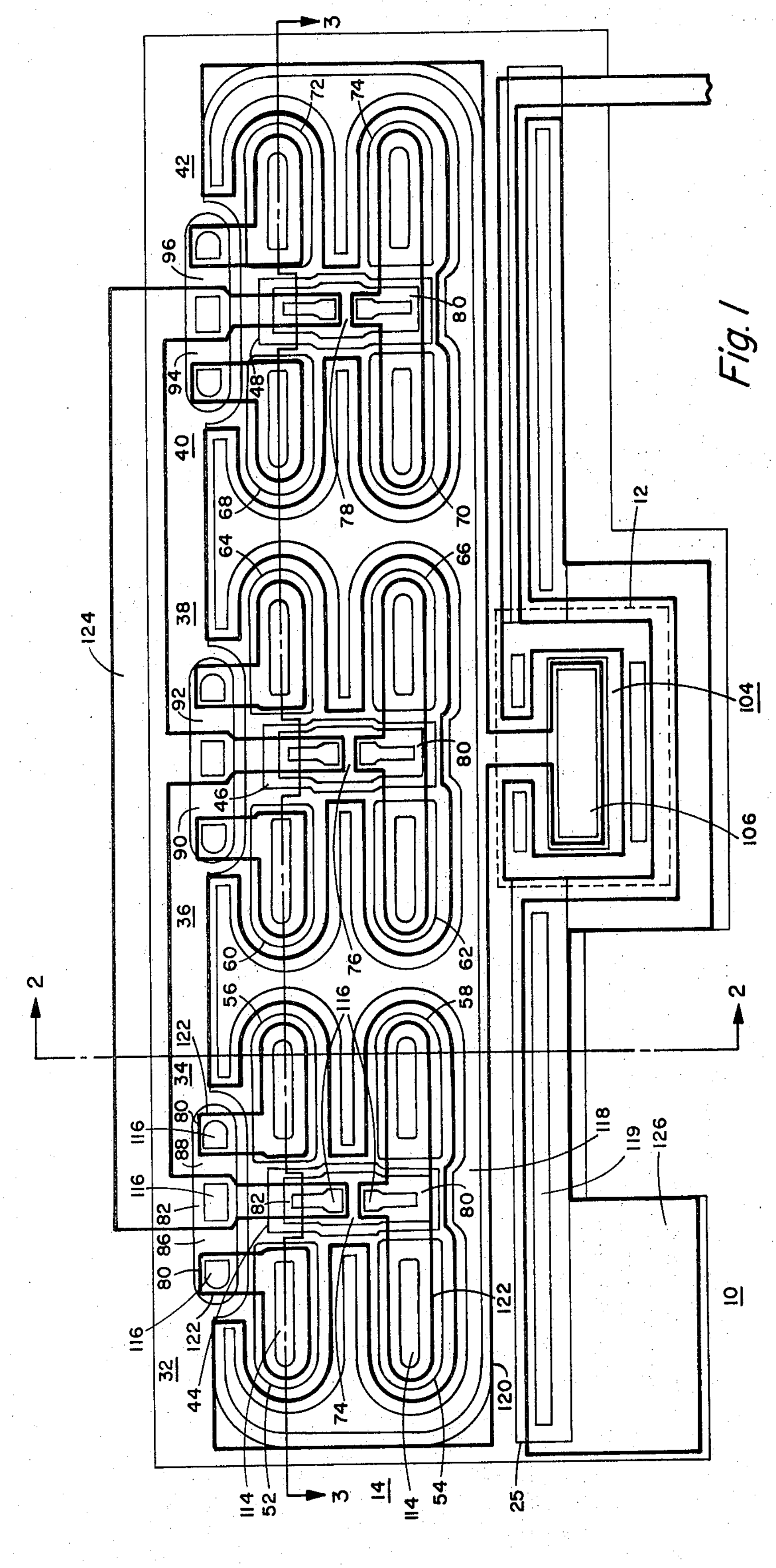
FIG. 1 is a top view of a preferred embodiment of the invention, illustrating a power Darlington device.

FIGS. 1 – 3 illustrate an integrated power Darlington device, a preferred embodiment of the invention, with structural features which provide improved safe operating area (SOA) over previously available devices. It is therefore appropriate at this point to include a brief discussion of the main characteristics influencing SOA of a power transistor. The graph in FIG. 4 is useful in such discussion.

Safe operating area is a measure of the safe power dissipating capability of a transistor, and is explained herein referring to FIG. 4. The graph in FIG. 4 illustrates two types of breakdown which may occur in a transistor. Collector current $I_C$ is represented on the vertical axis and the collector-to-emitter voltage $V_{CE}$ is represented on the horizontal axis. The vertical line designated by the letter M represents the current which will flow if the devices undergo breakdown when the base electrode is floating; this is a zero power dissipation condition. The voltage at which the breakdown occurs is designated $BV_{CEO}$. If a device is pulsed into a conducting state by a current pulse driven into its base electrode, the power dissipation will rise as the duty cycle of the current pulse waveform increases, and at some critical power dissipation (or duty cycle) the device goes into a second breakdown mode, called secondary breakdown. Secondary breakdown is illustrated in FIG. 4 by the line indicated by the letters J, K, and N, and is the phenomena which limits the power dissipating capability of the devices under discussion at high collector voltages, near $BV_{CEO}$.

As long as there is no base current into the transistor, that is as long as it is in the CEO mode, the transistor does not go into secondary breakdown, except at very high currents. Referring to FIG. 4, as the collector voltage is increased in the CEO mode, the collector current will increase along line M. However, if there is a sufficient amount of base current to trigger secondary breakdown, the collector voltage $V_{CE}$ will decrease along the line J-K-N as the collector current increases. Secondary breakdown may cause destruction of the device, and is therefore a limiting factor in determining the collector voltage and collector current limits for operating a transistor. Secondary breakdown is associated with both the collector-base junction and the emitter-base junction, and is controlled by the emitter-base junction. The electrical interplay of the junctions is such that secondary breakdown is triggered at lower magnitude collector voltages as the magnitude of the base drive is allowed to increase from zero. The phenomena is likely to occur at the sites of various material defects, such as dislocations, slippage in the lattice structure, etc. in the semiconductor material forming the base layer. During the emitter diffusion, diffusion spikes may occur at such sites. The exact mechanism of the secondary breakdown is not known, but seems to be associated with a concentration of current through a small region, which heats up, causing still greater current flow (i.e., current "hogging" occurs), which eventually melts the material in the small region causing the emitter and collector to be shorted together, destroying the device.

The maximum collector current permitted by the device specification, $I_c$ (max), is also shown on FIG. 4, and is designated by the horizontal line L. As the duty cycle of the base current pulsing waveform is increased, a family of curves is also for convenience, plotted, on FIG. 4 which indicates the values of $I_c$ and $V_{CEO}$ at which the device goes into secondary breakdown. The family of curves is indicated by letters O, P, Q and R in order of increasing duty cycle. For a device, the area bounded by the lines L and a particular line such as O, P, etc., is defined as the safe operating area (SOA) of the device at the specific duty cycle. As seen from FIG. 4, the SOA decreases as duty cycle increases. Stated differently, the safe operating area is the area on the collector characteristic in which the transistor will operate efficiently without going into a secondary breakdown mode. As indicated previously, when secondary breakdown occurs, the collector-to-emitter voltage is substantially reduced. In fact, the reduction in breakdown voltage is drastic, and may, for example, drop from over 100 volts to less than 10 volts, resulting in destruction of the device if the current is not externally limited. The dotted line between the reference letters J and K in FIG. 4 indicates the abrupt nature of secondary breakdown. It should be recognized that there may be a family of secondary breakdown curves, such as curve J-K-N, each occurring at a different current level. The current level at which the onset of secondary breakdown occurs varies mainly with the amount of base current and the amount of power being dissipated by the chip and its temperature.

Thermal dissipation efficiency is one of the main factors leading to the onset of secondary breakdown, since if heat is not quickly transferred away from regions of high current density along the emitter-base junction, hot spots will develop thereat, and the well-known phenomena of "current hogging" occurs, raising the temperature at the hot spot even more, causing secondary breakdown and device destruction to occur.

The device illustrated in FIGS. 1 – 3 has excellent thermal dissipation efficiency and additional features, as described hereinafter, which tend to reduce the tendency of hot spots to form, and consequently increase the SOA of the device. Referring to FIGS. 1 – 3, Darlington power device 10 includes an input transistor 12 and an output power transistor 14. Referring to FIGS. 2 and 3, power transistor 14 is fabricated in a first region 16 which may be N type. Layer 16 may be epitaxially formed on substrate 17, which may be P type. Closed, heavily doped P type isolation region 22 extends through region 16 to substrate 17, isolating the collector region 18 into which power transistor 14 is fabricated. A heavily doped N type buried layer region 21 is provided at the interface between collector region 18 and substrate 17, and extends outwardly into each.

Referring to FIGS. 1 – 3, a base region is formed within N type region 16. The base region is positioned over buried layer 21, which is substantially elongated. Buried layer 21 has an elongated extending portion 24 which extends beyond the edge of P type base region. An $N^+$ collector contact region 25 extends from surface 19 down to elongated extending portion 24 of buried layer 21. As seen in FIGS. 1 and 3, the base region includes base subregions 32, 34, 36, 38, 40, and 42.

First, second, and third inner subregions 44, 46, and 48 of N type collector region 18 extend to surface 19 of region 16. Inner subregion 44 is surrounded by base subregions 32 and 34, and inner subregion 46 is surrounded by base subregions 36 and 38, and inner subregion 48 is surrounded by base subregions 40 and 42. As illustrated in FIG. 1, base subregions 32, 34, 36, 38, 40 and 42 are connected to form a single, continuous base region. Inner subregions 44, 46, and 48 therefore appear in FIG. 1 as openings in the base region. However, it will be recognized that said base subregions do not have to form a continuous P type region.

A heavily doped N type emitter region is formed in the P type base region at surface 19, and is subdivided into 12 emitter subregions. Referring to FIG. 1, emitter subregions 52 and 54 are formed in base subregion 32; emitter subregions 56 and 58 are formed in base subregion 34; emitter subregions 60 and 62 are formed in base subregion 36; emitter subregions 64 and 66 are formed in base subregion 38; emitter subregions 68 and 70 are formed in base subregion 40; and finally, emitter subregions 72 and 74 are formed in base subregion 42. Emitter subregions 52, 56, 60, 64, 68, and 72 are positioned in line to form a first row of emitter subregions. Similarly, emitter subregions 54, 58, 62, 66, 70 and 74 are positioned in line to form a second row of emitter subregions sufficiently spaced from the first row to permit positioning of horizontal extensions of the base metal between the rows, and also sufficient to permit efficient transfer of heat away from the adjacent emitter base junction.

Still referring to FIG. 1, first, second, and third heavily doped N type emitter ballast resistors 74, 76, and 78 are formed, respectively, in inner subregions 44, 46, and 48. Also, $N^+$ emitter ballast resistors 86, 88, 90, 92, 94 and 96 are formed in first region 16 at surface 19 adjacent, respectively, to emitter subregions 52, 56, 60, 64, 68 and 72. Emitter ballast resistors 74, 76, 78, 86, 88, 90, 92 and 94 have, respectively, first ends 80, and second ends 82.

Referring to FIGS. 2 - 3, a passivation layer 112, which may be silicon dioxide, is formed on surface 19, and has therein preohmic openings for the base region, the emitter subregions, and the first and second ends of the ballast resistors. A separate emitter preohmic opening 114 is provided in layer 112 over each of the 12 $N^+$ emitter subregions. A base preohmic opening 118 is formed over the P type base region, including the six base subregions. A separate ballast resistor preohmic opening 116 is provided in layer 112 over each end of each of the nine ballast resistors. A collector contact preohmic opening 119 is provided in layer 112 over collector contact region.

Input transistor 12 has a base region 104 and an emitter region 106. A base metal layer 120, which may be aluminum, contacts base subregions 32, 34, 36, 38, 40 and 42 through preohmic opening 118 to provide ohmic contact to said base subregions. The base ohmic contact region defined by base preohmic opening 118 almost completely surrounds each of the emitter subregions, thereby preventing emitter debiasing due to the base spreading resistance. Also, the extensions of base metal layer 120 between the emitter subregions are relatively short, reducing the voltage drop along them, thereby reducing emitter debiasing. The emitter metallization includes metal layer 122, which connects the first end 80 of ballast resistor 74 to emitter subregions 54 and 58 through appropriate preohmic openings 114 and 116. Similarly, the first ends 80, respectively, of ballast resistors 76 and 78 are connected, respectively, to emitter subregions 62 and 66, and to emitter subregions 70 and 74. The second ends 82 of ballast resistors 74, 76 and 78 are connected to emitter terminal 124, which is also included in the emitter metallization. The second ends 82 of ballast resistors 86, 88, 90, 92, 94 and 96 are also connected to emitter terminal 124. The first ends of the ballast resistors 86 - 96 are connected, respectively, through preohmic openings 116 thereof to emitter subregions 52, 56, 60, 64, 68 and 72 through emitter preohmic openings 114 thereof. Collector metal layer 126 contacts collector contact region 25 through preohmic opening 119.

In summary, the invention provides a power transistor configuration in which a plurality of emitter subregions are aligned to form two rows, thereby facilitating efficient heat transfer from the emitter base junction and reducing the tendency for hot spots to develop in the inner portion of the device between rows. The base preohmic openings are arranged to substantially surround each of the emitter subregions, preventing appreciable emitter debiasing. The geometry permits the extensions of base metal to be relatively short, reducing series base resistance. Ballast resistors are provided between emitter subregions, saving area of the semiconductor die. A long, thin geometry is achieved using the configuration of the invention, so that a low saturation resistance is achieved utilizing collector contact diffusions on only one side of the device. In one embodiment in which the power transistor is utilized as the output transistor of an integrated Darlington device, all necessary connections are achieved without utilizing $N^+$ crossunders, which reduce yield by causing semiconductor-to-metal shorts and which require additional die area.

Although the invention has been described in relation to specific embodiments thereof, it will be recognized by those skilled in the art that variations in placement of parts to suit various requirements may be made which are within the scope of the invention.

What is claimed is:

1. A power transistor comprising:

a first region of a first conductivity type having a first surface, said first region including a collector region;

a base region of a second conductivity type in said first region at said first surface, said base region including first and second base subregions at said first surface;

a first inner subregion of said first region at said first surface, said first inner subregion being substantially surrounded by said first and second subregions;

an emitter region of said first conductivity type in said base region at said first surface, said emitter region being heavily doped and including first and second emitter subregions in said first base subregion and third and fourth emitter subregions in said second base subregion, said first, second, third and fourth emitter subregions being essentially elongated, said first and second emitter subregions lying essentially in line, said first and third emitter subregions being essentially parallel to said second and fourth emitter subregions;

second and third regions of said first conductivity type in said first region at said first surface, said second and third regions being relatively heavily doped, said third region being within said first inner subregion of said first region, and said second region being outside of said first inner subregion, said second region including first and second ballast resistors, and said third region including a third ballast resistor;

a first passivation layer on said first surface, said first passivation layer having therein a base preohmic opening on said first and second base subregions, and at least first, second, third and fourth emitter preohmic openings over, respectively, said first, second, third and fourth emitter subregions, said base preohmic opening substantially surrounding said first, second, third and fourth emitter subregions;

base metallization means contacting said base region through said base preohmic opening; and emitter metallization means contacting said first, second, third and fourth emitter subregions, respectively, through said first, second, third and fourth emitter preohmic openings, said emitter metallization means connecting said first and second ballast resistors in series, respectively, with said first and third emitter subregions, and also connecting said third ballast resistor in series with both said second and fourth emitter subregions, said emitter metallization means including an emitter terminal, said first, second and third ballast resistors being connected to said emitter terminal.

2. The power transistor as recited in claim 1 further comprising:

a buried layer of said first conductivity type, said buried layer being relatively heavily doped, and having an extending portion extending into said first region, said buried layer also extending laterally beyond said base region at one side thereof;

a relatively heavily doped, elongated collector contact region of said first conductivity type extending through said first region to said extending portion of said buried layer;

a substrate of said second conductivity type, said first region being on said substrate, and said buried layer extending into said substrate; and, an isolation region of said second conductivity type extending through said first region to said substrate, said isolation region being relatively heavily doped, said isolation region also being closed, and acting to isolate said collector region.

3. The power transistor as recited in claim 1 wherein said first conductivity type is N type and said second conductivity type is P type.

4. The power transistor as recited in claim 1 further including:

at least an additional first base subregion and an additional second base subregion in said base region, each said additional first base subregion and each said additional second base subregion, respectively, together substantially surrounding, respectively, an additional subregion;

an additional first emitter subregion and an additional second emitter subregion in each said additional first base subregion, and an additional third emitter subregion and an additional fourth emitter subregion in each said second base subregion, each said additional first and third emitter subregion being substantially in line with said first and third emitter subregions, and each said additional second and fourth emitter subregions being substantially in line with said second and fourth emitter subregions.

5. An integrated circuit power Darlington transistor device comprising:

a P type substrate;

a first N type region on said P type substrate, said first N type region including therein an N type collector region, said first N type region having a first surface thereof;

an N type buried layer between said P type substrate and said first N type region extending into said P type substrate and into said first N type region, said N type buried layer being relatively heavily doped, said buried layer also being elongated;

a closed, P type isolation region extending through said first N type region around said N type buried layer to said P type substrate, acting to isolate said N type collector region;

a P type first base region in said N type collector region over said N type buried layer region, an elongated, extending portion of said N type buried layer extending laterally beyond said P type base region, said P type base region including first, second, third, fourth, fifth and sixth base subregions;

first, second and third inner subregions of said N type collector region at said first surface, said first inner subregion being substantially surrounded at said first surface by said first and second base subregions, said second inner subregion being substantially surrounded at said first surface by said third and fourth base subregions, said third inner subregion being substantially surrounded at said first surface by said fifth and sixth base subregions;

a heavily doped N type first emitter region in said P type base region at said first surface, said first N type emitter region including first and second emitter subregions in said first base subregion, third and fourth emitter subregions in said second base subregion, fifth and sixth emitter subregions in said third base subregion, seventh and eighth emitter subregions in said fourth base subregion, ninth and tenth emitter subregions in said fifth base subregion, and eleventh and twelfth emitter subregions in said sixth base subregion, said first, third, fifth, seventh, ninth, and eleventh emitter subregions being elongated and substantially in line, and said second, fourth, sixth, eighth, tenth, and twelfth emitter subregions being elongated and substantially in line;

first, second and third N type ballast resistors in said first, second and third inner subregions, respectively, said first, second and third ballast resistors each having, respectively, first and second ends thereof;

fourth and fifth N type ballast resistors adjacent said first and second emitter subregions, respectively, sixth and seventh N type ballast resistors adjacent said fifth and seventh emitter subregions, respectively, and ninth and eleventh N type ballast resistors adjacent said ninth and eleventh emitter subregions, respectively, said fourth, fifth, sixth, seventh, eighth, and ninth N type ballast resistors each having, respectively, first and second ends thereof;

a passivation layer on said first surface, said passivation layer having therein a separate emitter preohmic opening, respectively, over each of said emitter subregions, a separate ballast resistor preohmic opening over each end of each of said ballast resistors, and a base preohmic opening, said base preohmic opening substantially surrounding each of said emitter subregions at said surface;

a driver transistor in said first N type region, within said closed P type isolation region, including a second base region and a second emitter region therein;

base metallization means on said passivation layer contacting said P type base region through said base preohmic opening and also contacting said second emitter; and emitter metallization means on said passivation layer contacting said emitter subregions through said emitter preohmic openings and contacting said ballast resistors through said ballast resistor preohmic openings, said emitter metallization including an emitter terminal, said emitter terminal contacting said first end of each of said N type ballast resistors, said emitter metallization also connecting said second and fourth emitter subregions to said second end of said first ballast resistor, and connecting said sixth and eighth emitter subregions to said second end of said second ballast resistor, and connecting said tenth and twelfth emitter subregions to said second end of said third ballast resistor, and connecting said first, third, fifth, seventh, ninth and eleventh emitter subregions to said second ends of said fourth, fifth, sixth, seventh, eighth and ninth ballast resistors, respectively.

* * * * *